United States Patent
Leibman et al.

(10) Patent No.: US 10,693,333 B2
(45) Date of Patent: Jun. 23, 2020

(54) WASHING MACHINE APPLIANCE AND REGULATOR ASSEMBLY

(71) Applicant: Haier US Appliance Solutions, Inc., Wilmington, DE (US)

(72) Inventors: Alexander B. Leibman, Prospect, KY (US); Mark Anthony Didat, Floyds Knobs, IN (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 717 days.

(21) Appl. No.: 15/362,982

(22) Filed: Nov. 29, 2016

(65) Prior Publication Data
US 2018/0148882 A1    May 31, 2018

(51) Int. Cl.
*D06F 39/08* (2006.01)
*H02K 1/32* (2006.01)
*H02K 1/27* (2006.01)
*H02K 7/18* (2006.01)
*H02K 7/14* (2006.01)

(52) U.S. Cl.
CPC ............ *H02K 1/32* (2013.01); *D06F 39/088* (2013.01); *H02K 1/27* (2013.01); *H02K 7/14* (2013.01); *H02K 7/1823* (2013.01)

(58) Field of Classification Search
None
See application file for complete search history.

(56) References Cited

U.S. PATENT DOCUMENTS 9,046,071 B2   6/2015  Portolan et al.
2015/0192030 A1   7/2015  Rubinshtein et al.

FOREIGN PATENT DOCUMENTS

DE   102010028612 A1 * 11/2011

OTHER PUBLICATIONS

Machine translation of DE102010028612A1.*

* cited by examiner

*Primary Examiner* — Michael E Barr
*Assistant Examiner* — Jason P Riggleman
(74) *Attorney, Agent, or Firm* — Dority & Manning, P.A.

(57) ABSTRACT

A washing machine appliance and a regulator assembly therefor are generally provided. The regulator assembly may include inductive regulator may be positioned along a fluid supply conduit downstream from a water supply. The inductive regulator may include a regulator body, a rotor, a magnetic element, and an electrical stator. The regulator body may define an enclosed cavity extending between a regulator inlet and a regulator outlet. The rotor may be rotatably disposed within the regulator body. The magnetic element may be rotationally attached to the rotor. The electrical stator may be disposed outside of the enclosed cavity in selective magnetic communication with the magnetic element.

20 Claims, 8 Drawing Sheets

WASHING MACHINE APPLIANCE AND REGULATOR ASSEMBLY

FIELD OF THE INVENTION

The present subject matter relates generally to washing machine appliances, and more particularly to washing machine appliances having one or more features for regulating the flow of fluid therethrough.

BACKGROUND OF THE INVENTION

Washing machine appliances generally include a tub for containing water or wash fluid (e.g., water and detergent, bleach, and/or other wash additives). A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc.

During operation of certain washing machine appliances, a volume of wash fluid is directed into the tub in order to wash and/or rinse articles within the wash chamber. One or more fluid additives may be added to the wash fluid to enhance the cleaning or other properties of the wash fluid. The fluid additives may be in powder or concentrated liquid form, and may be added to a dispenser box of the washing machine appliance by, e.g., a user of the washing machine appliance. The dispenser box may contain various chambers for containing different additives, e.g., wash detergent and softener.

However, in order to ensure proper concentration of certain additives (e.g., detergent), users must carefully measure the proper additive amount for each cycle, considering factors such as the size and type of the load, the temperature of the water, and the selected wash cycle. Although some washing machine appliances include additive dispensers, proper function of those dispensers may be contingent upon the flow rate of water to the wash chamber. If such systems are used within a geographic region having poor water pressure (e.g., below five pounds per square inch of water pressure) the systems may be unable to provide the desired ratio of water to additive. For instance, if an aspirator system is used, the system may be unable to force additive from a dispenser when relatively low fluid flow rates are provided. Conversely, an undesirable ratio of water to additive may also be provided if the water pressure and flow rate is excessively high, thus limiting the flexibility and potential use of such systems.

Accordingly, a washing machine appliance having one or more features for regulating water flow may be advantageous. More particularly, a washing machine appliance that can provide a suitable water flow rate over a wide range of water pressures would be desirable.

BRIEF DESCRIPTION OF THE INVENTION

Aspects and advantages of the invention will be set forth in part in the following description, or may be obvious from the description, or may be learned through practice of the invention.

In one aspect of the present disclosure a washing machine appliance is provided. The washing machine appliance may include a cabinet, a wash tub, a wash basket, a fluid supply conduit, and an inductive regulator. The wash tub may be positioned within the cabinet. The wash basket may be rotatably mounted within the wash tub. The wash basket may define a wash chamber for receiving articles for washing. The fluid supply conduit may extend between a water supply and the wash tub. The inductive regulator may be positioned along the fluid supply conduit downstream from the water supply. The inductive regulator may include a regulator body, a rotor, a magnetic element, and an electrical stator. The regulator body may define an enclosed cavity extending between a regulator inlet and a regulator outlet. The rotor may be rotatably disposed within the regulator body. The magnetic element may be rotationally attached to the rotor. The electrical stator may be disposed outside of the enclosed cavity in selective magnetic communication with the magnetic element.

In another aspect of the present disclosure a washing machine appliance is provided. The washing machine appliance may include a cabinet, a wash tub, a wash basket, a fluid supply conduit, an inductive regulator, and a controller. The wash tub may be positioned within the cabinet. The wash basket may be rotatably mounted within the wash tub. The wash basket may define a wash chamber for receiving articles for washing. The fluid supply conduit may extend between a water supply and the wash tub. The inductive regulator may be positioned along the fluid supply conduit downstream from the water supply. The inductive regulator may include a regulator body, a rotor, a magnetic element, and an electrical stator. The regulator body may define an enclosed cavity extending between a regulator inlet and a regulator outlet. The rotor may be rotatably disposed within the regulator body. The magnetic element may be rotationally attached to the rotor. The electrical stator may be disposed outside of the enclosed cavity in selective magnetic communication with the magnetic element. The controller may be electrically coupled to the electrical stator in operable communication with the magnetic element. The controller may be configured to selectively direct a torque current to the electrical stator to control rotation of the rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
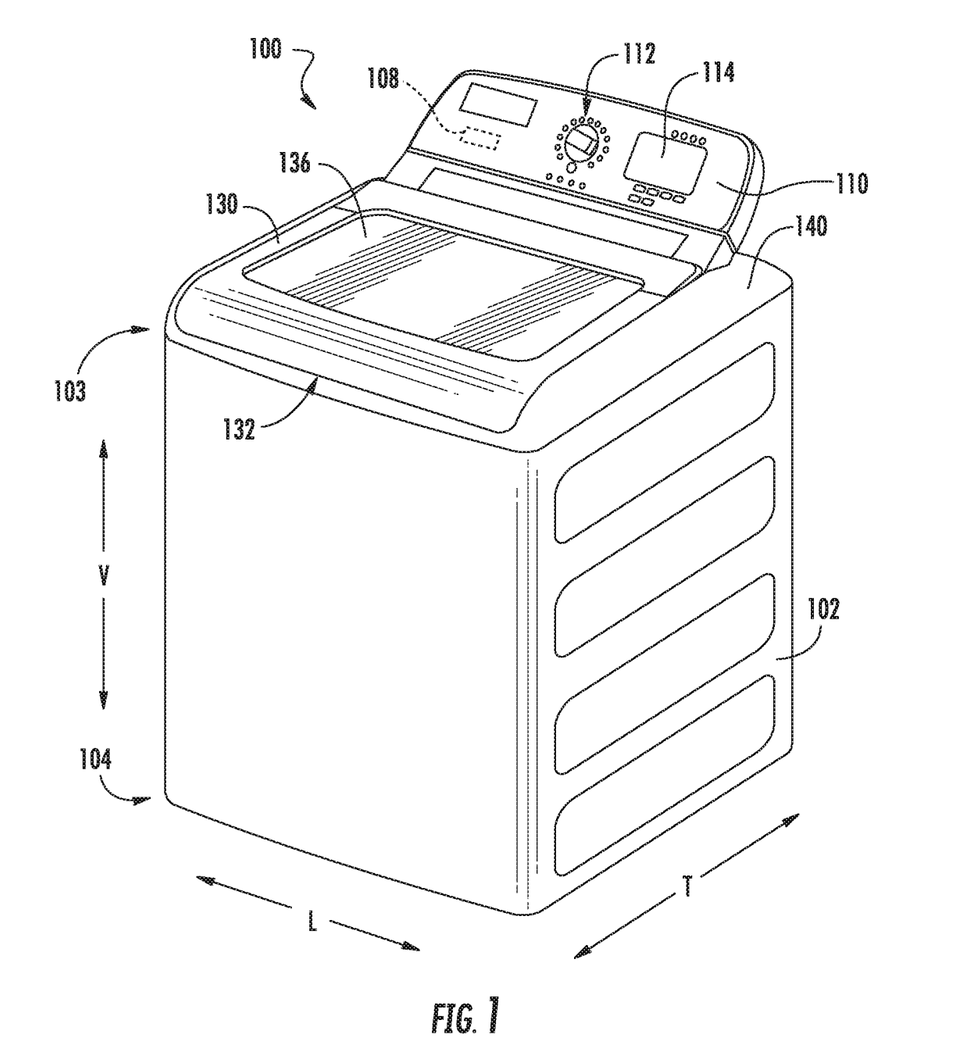
FIG. 1 provides a perspective view of a washing machine appliance according to example embodiments of the present subject matter, wherein a door of an example washing machine appliance is in a closed position.
Figure 2:
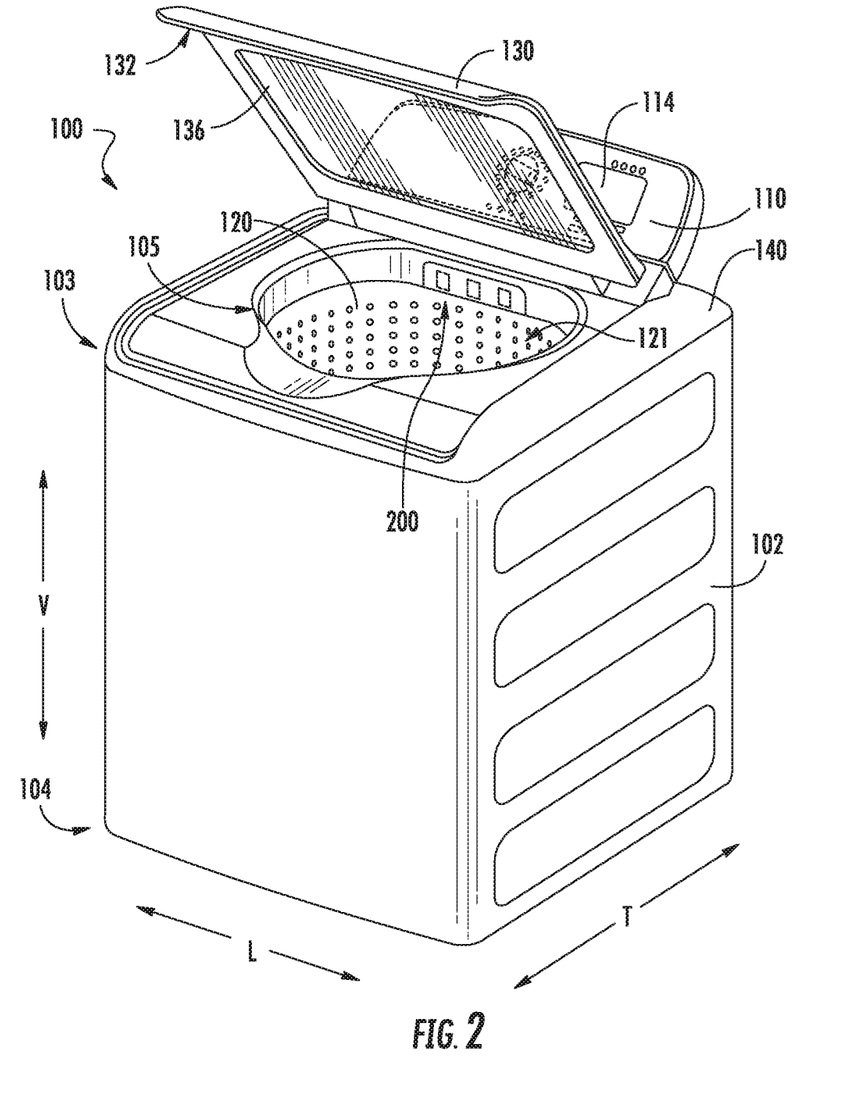
FIG. 2 provides a perspective view of the example washing machine appliances of FIG. 1, wherein the door of the example washing machine appliance is in an open position.

FIGS. 1 and 2 illustrate an example embodiment of a vertical axis washing machine appliance 100. In FIG. 1, a lid or door 130 is shown in a closed position. In FIG. 2, door 130 is shown in an open position. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, using the teachings disclosed herein it is understood that vertical axis washing machine appliance 100 is provided by way of example only. Other washing machine appliances having different configurations, different appearances, and/or different features may also be utilized with the present subject matter as well, e.g., horizontal axis washing machines.

Washing machine appliance 100 has a cabinet 102 that extends between a top portion 103 and a bottom portion 104 along the vertical direction V. A wash basket 120 (FIG. 2) is rotatably mounted within cabinet 102. A motor (not shown) is in mechanical communication with wash basket 120 to selectively rotate wash basket 120 (e.g., during an agitation or a rinse cycle of washing machine appliance 100). Wash basket 120 is received within a wash tub or wash chamber 121 (FIG. 2) and is configured for receipt of articles for washing. The wash tub 121 holds wash and rinse fluids for agitation in wash basket 120 within wash tub 121. An agitator or impeller (not shown) extends into wash basket 120 and is also in mechanical communication with the motor. The impeller assists agitation of articles disposed within wash basket 120 during operation of washing machine appliance 100.

Cabinet 102 of washing machine appliance 100 has a top panel 140. Top panel 140 defines an opening 105 (FIG. 2) that permits user access to wash basket 120 of wash tub 121. Door 130, which is rotatably mounted to top panel 140, permits selective access to opening 105; in particular, door 130 selectively rotates between the closed position shown in FIG. 1 and the open position shown in FIG. 2. In the closed position, door 130 inhibits access to wash basket 120. Conversely, in the open position, a user can access wash basket 120. An optional window 136 in door 130 may permit viewing of wash basket 120 when door 130 is in the closed position, e.g., during operation of washing machine appliance 100. Door 130 also includes a handle 132 that, e.g., a user may pull and/or lift when opening and closing door 130. Further, although door 130 is illustrated as mounted to top panel 140, alternatively, door 130 may be mounted to cabinet 102 or any other suitable support.

A control panel 110 with at least one input selector 112 (FIG. 1) extends from top panel 140. Control panel 110 and input selector 112 collectively form a user interface input for operator selection of machine cycles and features. A display 114 of control panel 110 indicates selected features, operation mode, a countdown timer, and/or other items of interest to appliance users regarding operation.

Operation of washing machine appliance 100 is controlled by a controller or processing device 108 (FIG. 1) that is connected (e.g., electrically coupled) to control panel 110 for user manipulation to select washing machine cycles and features. In response to user manipulation of control panel 110, controller 108 operates the various components of washing machine appliance 100 to execute selected machine cycles and features.

Controller 108 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 110 and other components of washing machine appliance 100 may be in communication with controller 108 via one or more signal lines or shared communication busses.

During operation of washing machine appliance 100, laundry items may be loaded into wash basket 120 through opening 105, and washing operation may be initiated through operator manipulation of input selectors 112. Wash additives may be added to washing machine appliance 100 to assist in the cleaning process. In this regard, as will be described in detail below, a dispensing assembly 200 is configured to provide one or more wash additives, such as powdered detergent, concentrated wash fluid, pretreating additive, bleach, etc.

Water may be added to dispensing assembly 200 to mix with wash additives and create a wash fluid that may be dispensed into wash basket 120. One or more valves can be controlled by washing machine appliance 100, e.g., at controller 108, to provide for filling wash basket 120 to the appropriate level for the amount of articles being washed and/or rinsed. By way of example for a wash mode, once wash basket 120 is properly filled with fluid, the contents of wash basket 120 can be agitated (e.g., with an impeller as discussed previously) for washing of laundry items in wash basket 120.

After the agitation phase of the wash cycle is completed, wash basket 120 can be drained. Laundry articles can then be rinsed by again adding fluid to wash basket 120 depending on the specifics of the cleaning cycle selected by a user. The impeller may again provide agitation within wash basket 120. One or more spin cycles also may be used. In particular, a spin cycle may be applied after the wash cycle and/or after the rinse cycle to wring wash fluid from the articles being washed. During a spin cycle, wash basket 120 is rotated at relatively high speeds. After articles disposed in wash basket 120 are cleaned and/or washed, the user can remove the articles from wash basket 120, e.g., by reaching into wash basket 120 through opening 105.

Figure 3:
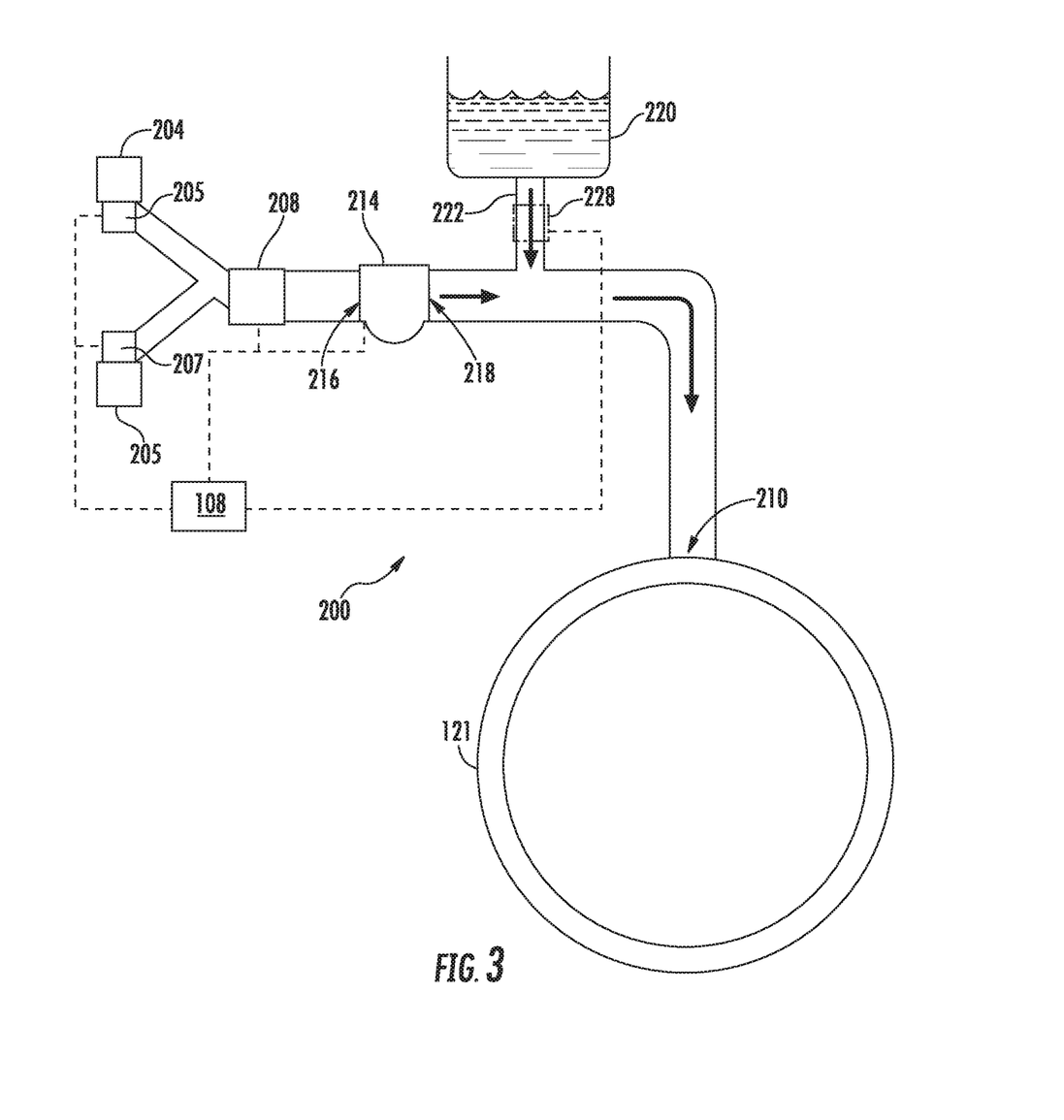
FIG. 3 provides a schematic view of a dispensing assembly according to example embodiments of the present subject matter.
Figure 4:
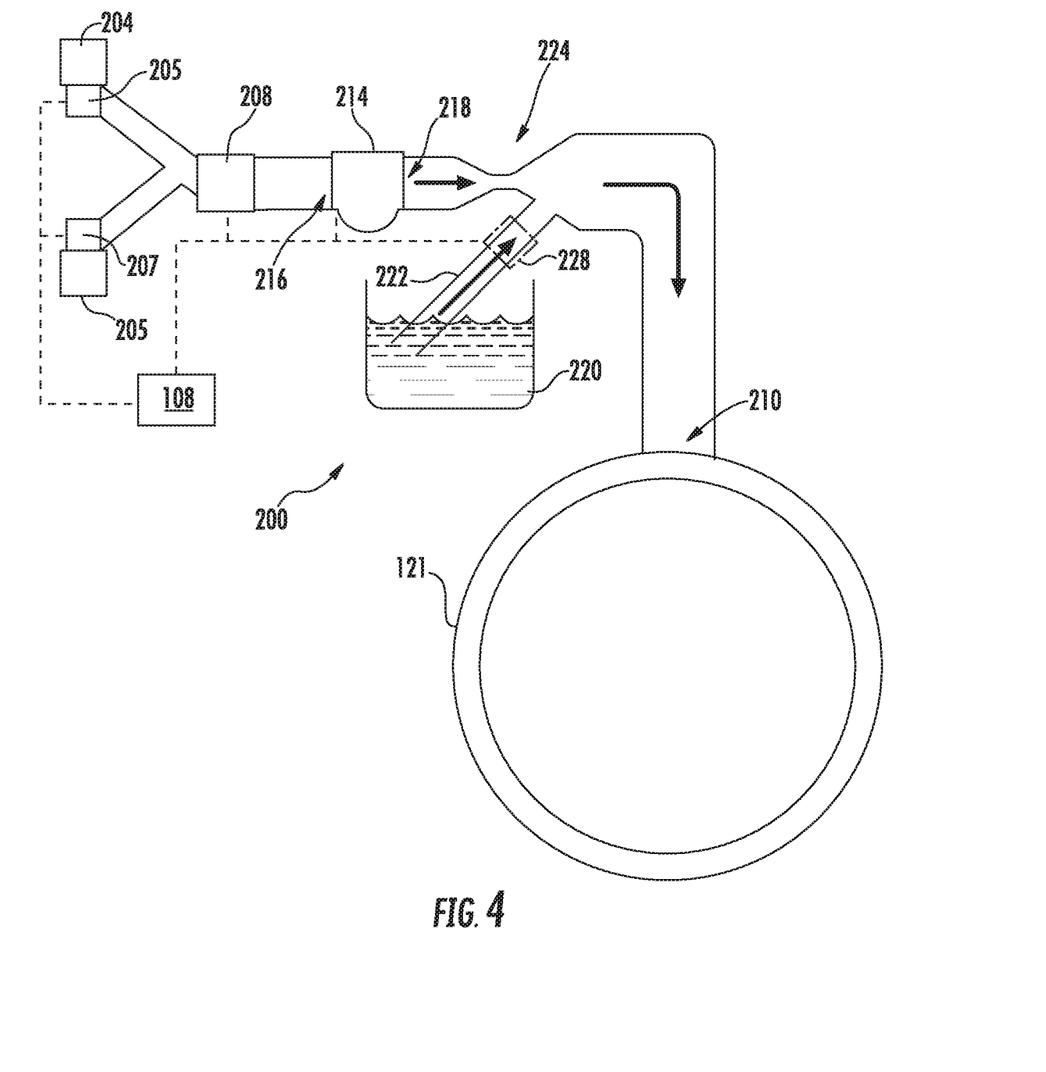
FIG. 4 provides a schematic view of another dispensing assembly according to example embodiments of the present subject matter.
Figure 5:
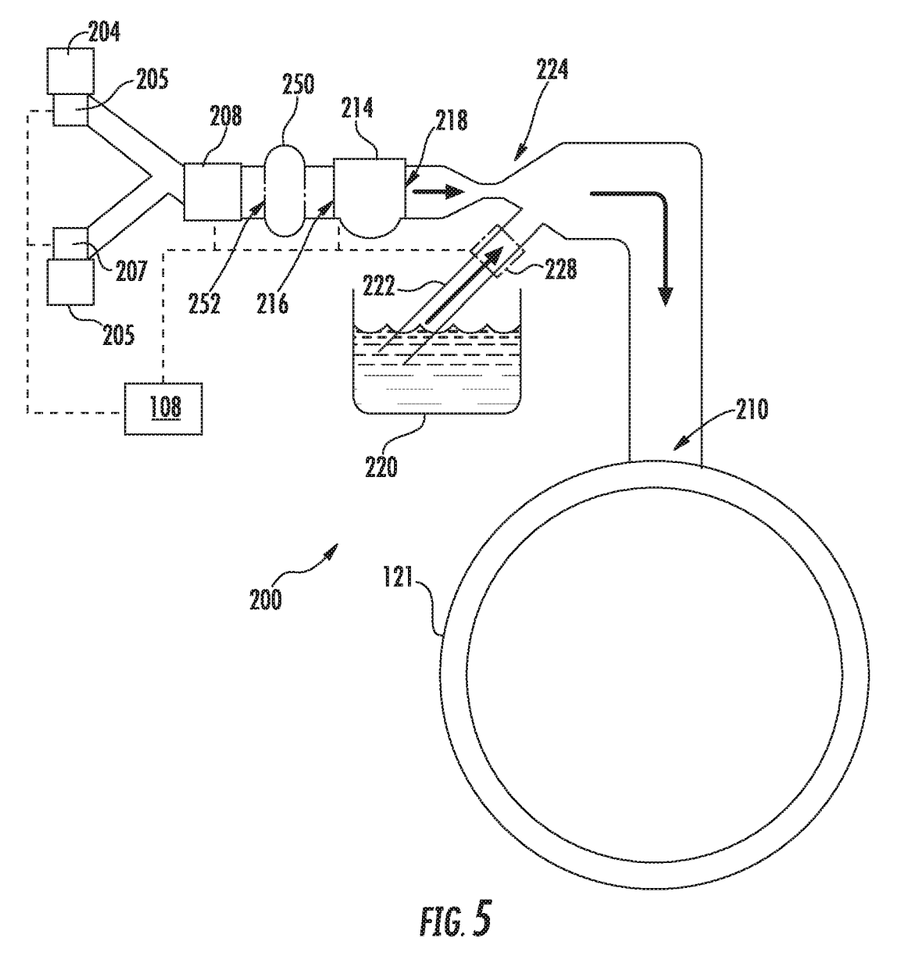
FIG. 5 provides a schematic view of yet another dispensing assembly according to example embodiments of the present subject matter.
Figure 6:
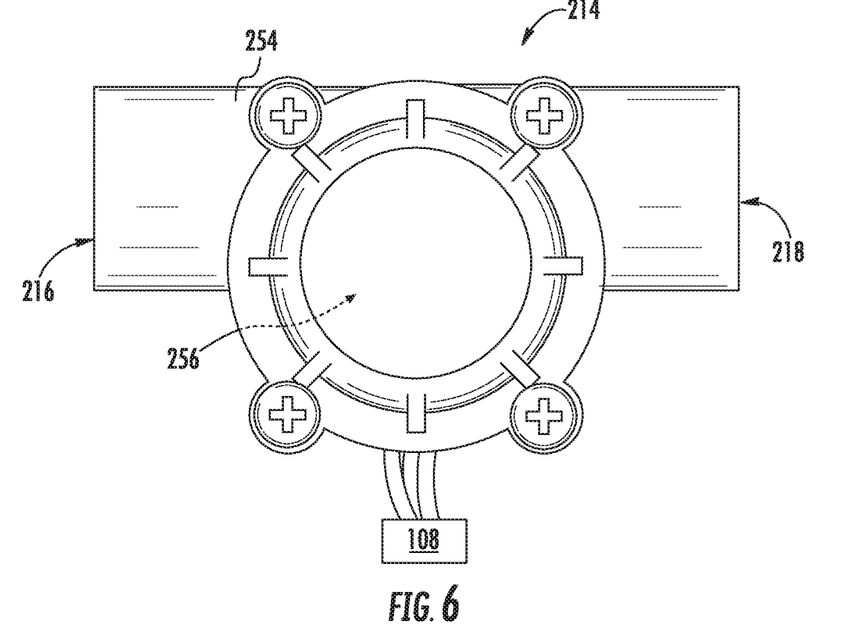
FIG. 6 provides a front view of an inductive regulator of a washing machine appliance according to example embodiments of the present subject matter.
Figure 7:
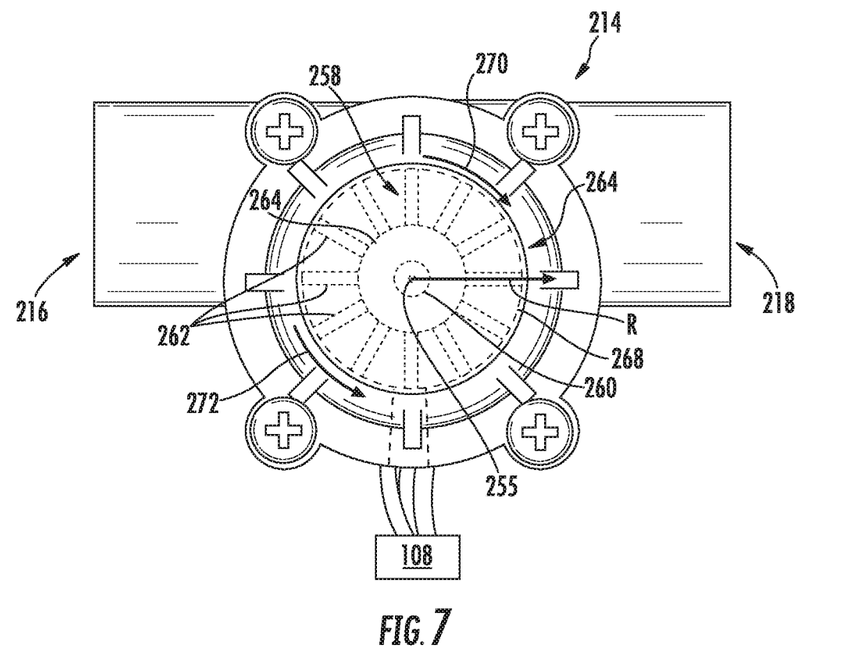
FIG. 7 provides a partially transparent front view of the example inductive regulator of FIG. 6.
Figure 8:
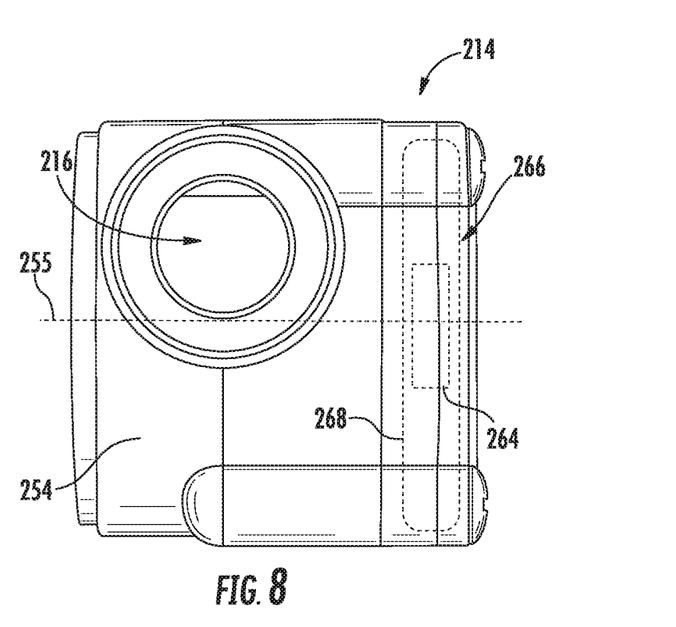
FIG. 8 provides a partially transparent side view of the example inductive regulator of FIG. 6.
Figure 9:
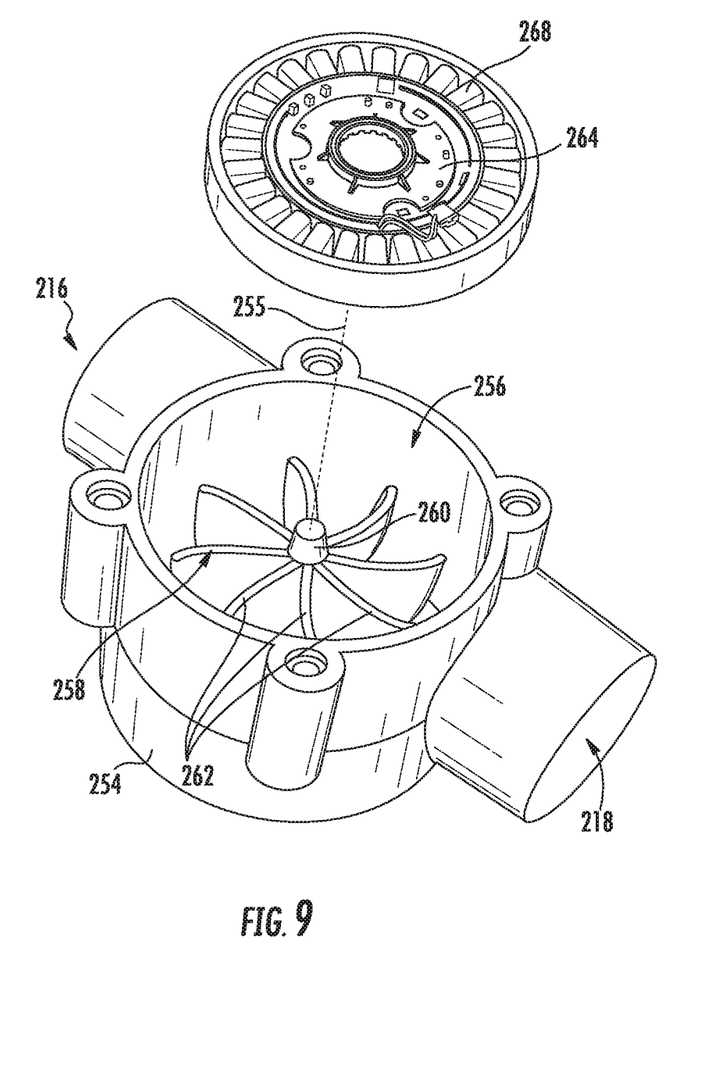
FIG. 9 provides a perspective view of the example inductive regulator of FIG. 6, wherein a cover has been removed.

Referring now to FIGS. 3 through 5, a dispensing assembly 200 for an appliance, such as washing machine appliance 100, will be described in more detail. Although the discussion below refers to dispensing assembly 200, one skilled in the art will appreciate that the features and configurations described may be used for other fluid dispensers in other washing machine appliances as well. For example, dispensing assembly 200 may be positioned elsewhere within cabinet 102, may have a different components or configurations, and may dispense water, detergent, or other additives. Other variations and modifications of the example embodiments described below are possible, and such variations are contemplated as within the scope of the present subject matter.

According to an example embodiment, dispensing assembly 200 may be mounted within cabinet 102 using a plurality of mounting features or mechanical fasteners. Additionally or alternatively, adhesive(s), snap-fit mechanisms, interference-fit mechanisms, or any suitable combination thereof may secure dispensing assembly 200 to cabinet 102. One skilled in the art will appreciate that dispensing assembly 200 may be mounted in other locations and use other mounting means according to alternative embodiments.

Referring now specifically to FIG. 3, an example embodiment of dispensing assembly 200 will be described in detail. As shown, water or wash fluid is provided to wash tub 121 through a fluid supply conduit 202. As an example, fluid supply conduit 202 may receive hot and cold water from a hot water inlet 204 and a cold water inlet 206, respectively. Hot water inlet 204 may be provided on or at a hot water supply, such as a domestic or commercial hot water tank. Cold water inlet 206 may be provided on or at a cold water supply, such as a well or municipal water-supply network.

In order to dispense wash fluid at the desired temperature, hot and cold water may be selectively dispensed in ratios that produce the desired water temperature. For example, the flow of hot water through hot water inlet 204 may be selectively adjusted using a hot water solenoid valve 205. Moreover, the flow of cold water through cold water inlet 206 may be selectively adjusted using a cold water solenoid valve 207. In some embodiments, controller 108 is electrically coupled to one or more of solenoid valves 205, 206. According to one or more wash conditions, the flow of water through one or both of hot water solenoid valve 205 or cold water inlet 206 may be increased or decreased. For instance, one or both of hot water solenoid valve 205 or cold water inlet 206 may be selectively controlled to provide water at a predetermined temperature based on at least one of the selected wash cycle, the soil level of the articles to be washed, and the article type.

In optional additional or alternative embodiments, a diverter or supply valve 208 is fluidly connected to (e.g., in fluid communication with) hot water inlet 204 and cold water inlet 206. Supply valve 208 may be positioned downstream from inlets 204, 206 and upstream from fluid supply conduit 202. During operation, supply valve 208 may selectively permit water (e.g., a mixture of hot water and cold water) into fluid supply conduit 202. Optionally, supply valve 208 may be a solenoid valve. In some embodiments, controller 108 is electrically coupled to supply valve 208.

As illustrated, fluid supply conduit 202 may extend to (e.g., terminate at) wash tub 121. According to the illustrated embodiment, fluid supply conduit 202 is fluidly connected to wash tub 121 through a dispensing nozzle 210. Fluid supply conduit 202 may connect to wash tub 121 in any manner suitable for dispensing water and/or wash fluid into wash tub 121. For example, dispensing nozzle 210 may have a tapered or narrowed diameter from fluid supply conduit 202. Alternatively, fluid supply conduit 202 may simply terminate at wash tub 121 with no change in its diameter, or fluid supply conduit 202 may have a Venturi-shaped end.

An inductive regulator 214 defining an inlet 216 and an outlet 218 is generally positioned along the fluid supply conduit 202. In certain embodiments, inductive regulator 214 is positioned downstream from the water supply, e.g., in fluid communication therewith. Moreover, inductive regulator 214 may be positioned upstream from wash tub 121. In some embodiments, inductive regulator 214 positioned in fluid communication between water supply valve 208 and dispensing nozzle 210. In alternative embodiments, no water supply valve 208 is provided, in which case inductive regulator is in fluid communication between water supply (e.g., inlets 204 and 206) and dispensing nozzle 210. As will be described in greater detail below, inductive regulator 214 may thus operate to propel or restrict wash fluid through fluid supply conduit 202, e.g., from inlets 204, 206 to wash tub 121.

In some embodiments, controller 108 is electrically coupled to inductive regulator 214. According to one or more wash conditions, inductive regulator 214 may be activated to regulate fluid (e.g., water or wash fluid) therethrough. For instance, inductive regulator 214 may be selectively controlled or activated to generate a pump pressure or volumetric flow rate based on at least one of the selected wash cycle, the soil level of the articles to be washed, and the article type. The pump pressure or volumetric flow rate generated downstream of inductive regulator 214 may be greater than or less than a pump pressure or volumetric flow rate upstream from inductive regulator 214 (e.g., at water supply).

Dispensing assembly 200 may further include an additive dispenser 220, e.g., a reservoir for storing wash additive. In this regard, additive dispenser 220 may be configured to receive one or more wash additives. More particularly, according to an example embodiment, additive dispenser 220 includes a reservoir that is intended to store sufficient wash additives for one or more wash cycles. Wash additive may be either a liquid or particulate material (e.g., a liquid, a particulate, or a combination of a liquid and a particulate). In one embodiment, the wash additive is a detergent. In another embodiment, the wash additive is a fabric softener. In yet another embodiment, the wash additive is a mixture of detergent and fabric softener.

Additive dispenser 220 is fluidly connected to (e.g., in fluid communication with) fluid supply conduit 202 through an additive supply conduit 222. As water is supplied through fluid supply conduit 202 into wash tub 121, additive dispenser 220 may release a predetermined volume of additive through additive supply conduit 222. In this manner, the flowing water may entrain, mix, and dissolve the wash additive to form a wash fluid prior to dispensing into wash tub 121 through dispensing nozzle 210. According to alternative embodiments, additive supply conduit 222 may be connected further upstream on fluid supply conduit 202 or in a location where wash additive may dissolve more quickly, e.g., near hot water inlet 204.

Optionally, dispensing assembly 200 may include a valve 228 configured to control the flow of wash additive through additive supply conduit 222. For example, valve 228 may be a solenoid valve that is electrically coupled to controller 108. Controller 108 may selectively open and close valve 228 to allow wash additive to flow from additive dispenser 220 through additive supply conduit 222. For example, during a rinse cycle where only water is desired, valve 228 may be closed to prevent wash additive from being dispensed through additive supply conduit 222. In some embodiments, valve 228 is selectively controlled based on at least one of the selected wash cycle, the soil level of the articles to be washed, and the article type.

As illustrated, additive supply conduit 222 is positioned downstream from inductive regulator 214. Moreover, additive supply conduit 222 is positioned in fluid communication with fluid supply conduit 202. During operations, pressure generated at inductive regulator 214, e.g., between inlet 216 and outlet 218, may selectively increase or decrease the fluid pressure (e.g., water pressure) from supply inlets 204, 206. For example, inductive regulator 214 may increase pressure within fluid supply conduit 202 downstream from inductive regulator 214, e.g., at outlet 218. Inductive regulator 214 may be activated to propel or add additional propulsive force to water flowing from inlet 216 and outlet 218. Additionally or alternatively, inductive regulator 214 may decrease pressure within fluid supply conduit 202 downstream from inductive regulator 214, e.g., at outlet 218. Inductive regulator 214 may be activated to restrict or generate a counteracting force to water flowing from inlet 216 and outlet 218.

Inductive regulator 214 may thus be configured to propel or restrict fluid supply conduit 202. In some embodiments, inductive regulator 214 is configured to generate (with either a propulsive or counteracting force) a positive pressure between thirty pounds per square inch (30 psi) and two hundred pounds per square inch (200 psi) downstream from inductive regulator 214. In other embodiments, inductive regulator 214 is configured to generate a positive pressure greater than one hundred pounds per square inch (100 psi) downstream from inductive regulator 214. In certain circumstances or geographic locations, the negative pressure created within additive supply conduit 222 may thus be greater than would be created by the motivation of water from water supply inlet(s) 204, 206 alone. Advantageously, a suitable amount of additive may be supplied through additive supply conduit 222 from additive dispenser 220, even in circumstances or locations at which water supply pressure is relatively low, e.g., below five pounds per square inch (5 psi). Moreover, a suitable amount of additive may be supplied through additive supply conduit 222 from additive dispenser 220, even in circumstances or locations at which water supply pressure is relatively high, e.g., above two hundred pounds per square inch (200 psi).

According to the illustrated example embodiments, fluid supply conduit 202 is fluidly connected to wash tub 121 through dispensing nozzle 210, and additive supply conduit 222 is fluidly connected to fluid supply conduit 202.

During operation, dispensing assembly 200 adds a wash additive from additive dispenser 220 in proportion to the amount of water flowing through fluid supply conduit 202. More specifically, water is provided from cold water inlet 206 and hot water inlet 204 to achieve the desired temperature and an initial flow rate. Inductive regulator 214 may be activated to achieve the desired flow rate (e.g., a flow rate that is greater than or less than the initial flow rate from inlets 204, 206). This flow rate and temperature may be controlled by controller 108 or may be manually adjusted by the user. The wash additive travels through additive supply conduit 222 and is injected into fluid supply conduit 202. The water traveling through fluid supply conduit 202 entrains, mixes, and dissolves the wash additive to create a wash fluid that is dispensed into wash tub 121. Notably, the concentration of wash additive in the wash fluid may be proportional to the amount of water delivered to wash tub 121.

As illustrated in FIG. 4, some embodiments include an additive dispenser 220 that motivates additive through a negative or vacuum pressure. In such embodiments, additive supply conduit 222 may define a siphon channel that draws in wash additive from additive dispenser 220 when water flows through fluid supply conduit 202. More particularly, as water is supplied through fluid supply conduit 202 into wash tub 121, the flowing water creates a negative pressure within additive supply conduit 222. This negative pressure may draw in wash additive from additive dispenser 220, e.g., in proportion to the amount of water flowing through fluid supply conduit 202. Additive supply conduit 222 may be calibrated according to a desired amount of wash additive. For instance, the siphon channel of additive supply conduit 222 may be sized and shaped to provide a selected flow rate, e.g., volumetric flow rate, of the wash additive. The selected flow rate of the wash additive may be set according to a predetermined flow rate and/or pressure through the fluid supply conduit 202, e.g., a flow rate determined or generated by inductive regulator 214. During operation, the selected flow rate of the wash additive may be proportional to the predetermined flow rate of water through the fluid supply conduit 202.

In some embodiments, additive supply conduit 222 is fluidly connected to fluid supply conduit 202 through a Venturi nozzle 224. Venturi nozzle 224 is positioned downstream from inductive regulator 214 and receives the siphon channel of additive supply conduit 222. The additive supply conduit 222 and Venturi nozzle 224 may be configured (e.g., sized and shaped) to ensure the desired amount of wash additive is supplied for a given water flow rate through fluid supply conduit 202. For example, by changing the diameter of the additive supply conduit 222 and the flow restriction of Venturi nozzle 224, the volumetric flow rate of wash additive may be adjusted.

During operation, dispensing assembly 200 adds a wash additive from additive dispenser 220 in proportion to the amount of water flowing through fluid supply conduit 202. More specifically, water may be provided from cold water inlet 206 and hot water inlet 204 to achieve the desired water flow rate and temperature. This flow rate and temperature may be controlled by controller 108 or may be manually adjusted by the user. Water flows into the fluid supply conduit 202 past Venturi nozzle 224, creating a negative pressure in additive supply conduit 222. This negative pressure draws in wash additive from additive dispenser 220. The wash additive travels through additive supply conduit 222 and is injected into fluid supply conduit 202 by Venturi nozzle 224. The water traveling through fluid supply conduit 202 entrains, mixes, and dissolves the wash additive to create a wash fluid that is dispensed into wash tub 121. Notably, the concentration of wash additive in the wash fluid may be proportional to the amount of water delivered to wash tub 121.

As illustrated in FIG. 5, some embodiments include a discrete flow reservoir 250 upstream from inductive regulator 214. Flow reservoir 250 generally defines an enlarged or enlarging chamber 252 to contain a predetermined volume of fluid (e.g., water). In some embodiments, the flow reservoir 250 is an expanded portion of fluid supply conduit 202. The expanded portion may define an internal passage diameter that is greater than the rest of the fluid supply conduit 202. Additionally or alternatively, flow reservoir 250 may include a resilient bladder formed from an elastic material (e.g., a synthetic or natural rubber). As water flows to fluid supply conduit 202, the resilient bladder of such embodiments may expand until the predetermined volume of water is contained therein.

As water flows through fluid supply conduit 202, flow reservoir 250 may fill to contain the predetermined volume of water, e.g., along the path of water through fluid supply conduit 202. Once the predetermined volume fills enlarged chamber 252, water may flow from and/or through flow reservoir 250 (i.e., downstream therefrom).

Optionally, the predetermined volume of water may correspond to a desired additive volume. In other words, the predetermined volume of water may be sufficient to produce a desired wash fluid when mixed with the desired additive volume. In turn, after the predetermined volume of water fills flow reservoir 250, inductive regulator 214 may be activated to motivate the predetermined volume from the enlarged chamber 252. The flow of the predetermined volume of water pas Venturi nozzle 224 may create a negative pressure in additive supply conduit 222. As described above, the negative pressure draws in wash additive from additive dispenser 220. The wash additive travels through additive supply conduit 222 and is injected into fluid supply conduit 202 by Venturi nozzle 224. In other words, pressure created by the flow of predetermined volume of water may draw the desired additive volume from the additive dispenser 220. The predetermined volume of water may entrain, mix, and dissolve the desired wash additive volume to produce the desired wash fluid.

Turning now to FIGS. 6 through 9, an example inductive regulator 214 is provided. As illustrated, inductive regulator 214 includes a regulator body 254 defining a regulator inlet 216 and a regulator outlet 218. An enclosed cavity is defined between regulator inlet 216 and regulator outlet 218 to direct fluid through regulator body 254. A rotor 258, such as a pinwheel or impeller, is disposed within regulator body 254.

Rotor 258 is rotatably positioned within regulator body 254. In turn, rotor 258 may be configured to rotate relative to and within regulator body 254 about an axis of rotation 255. In some embodiments, rotor 258 includes a spoke 260 that defines the axis of rotation 255. Additionally or alternative, rotor 258 may include a plurality of fins 262 extending in a radial direction R from the axis of rotation 255. For instance, the plurality of fins 262 may extend radially from spoke 260. In some embodiments, one or more of the plurality of fins 262 at least partially extends across a flow path of water within regulator body 254 between inlet 216 and outlet 218, e.g., during rotation. As fins 262 rotate, they may thus affect and/or adjust a fluid flow through the enclosed cavity 256.

A magnetic element 264, e.g., a permanent magnet having two magnetic poles, is rotationally attached to rotor 258. Specifically, magnetic element 264 may be attached such that rotor 258 rotates with magnetic element 264. In some such embodiments, magnetic element 264 is directly fixed to a portion of rotor 258, e.g., by an adhesive and/or mechanical connector. In the example embodiment of FIGS. 6 through 9, magnetic element 264 is fixed relative to the axis of rotation 255. In specific embodiments, magnetic element 264 may thus be disposed about spoke 260. Moreover, the magnetic poles of magnetic element 264 may be uniformly distributed about the axis of rotation 255.

In some embodiments, inductive regulator 214 includes an electrical stator 266 mounted outside of enclosed cavity 256. For instance, electrical stator 266 may be disposed within regulator body 254, such as within a sealed subcompartment that is in fluid isolation from enclosed cavity 256. Electrical stator 266 may include one or more conductive elements (e.g., copper wires) formed as a conductive winding 268 having a plurality of turns to conduct an electrical current therethrough.

In some embodiments, electrical stator 266, including the winding 268 thereof, is disposed about the axis of rotation 255. Specifically, electrical stator 266 may be disposed about magnetic element 264. Moreover, electrical stator 266 may be rotationally isolated from rotor 258. In some such embodiments, electrical stator is either mounted to or embedded within a portion of regulator 254. As rotor 258 rotates within regulator body 254, electrical stator 266 may thus remain stationary.

Electrical stator 266 is generally connected (e.g., electrically coupled) to controller 108. When assembled, electrical stator 266 is in operable communication (e.g., selective magnetic communication) with magnetic element 264. As an electrical current is directed through stator 266, a magnetic field may be generated, e.g., to motivate or influence magnetic element 264. For instance, a direct electrical current may be conducted through electrical stator 266 from a power source (not pictured) as instructed or initiated by controller 108. Conversely, rotation of magnetic element 264 may induce an electrical current within stator 266. Specifically, an electrical current may be induced by the magnetic element 264 when a direct electrical current is not being conducted through electrical stator 266. The induced current may be directed, e.g., as a rotation signal, to controller 108. A voltage of the rotation signal may be varied according to the rotating magnetic field generated from magnetic element 264.

In some embodiments, controller 108 is configured to receive the rotation signal and measure rotation speed according the received rotation signal or voltage. In other words, magnetic element 264 and electrical stator 266 may selectively operate as a Hall Effect sensor. Based on the measured rotation speed, controller 108 may determine a flow rate (e.g., volumetric flow rate) of water through inductive regulator 214. Controller 108 may thus be configured to selectively receive the induced current from electrical stator 266 in response to a flow-motivated rotation of the rotor 258.

In some embodiments, controller 108 is configured to regulate or influence the flow rate of fluid through inductive regulator 214. Specifically, controller 108 may be configured to selectively direct an electrical torque current to electrical stator 266. The torque current may induce a magnetic field at electrical stator 266 that, in turn, generates a torque at magnetic element 264. Optionally, the generated torque may be a propulsive torque, which motivates the magnetic element 264 and rotor 258 in a first rotational direction 270. As water is supplied to inductive regulator 214, the propulsive torque may generally increase the flow rate of water through inductive regulator 214. Alternatively or alternately, the generated torque may be a restrictive torque, which biases the magnetic element 264 in a second rotational direction 272. As water is supplied to inductive regulator 214, the restrictive torque may generally decrease the flow rate of water through inductive regulator 214.

The second rotational direction 272 is understood to be opposite direction from the first rotational direction 270. However, it should be noted that while the restrictive torque acts in the opposite direction of the propulsive torque, rotation of the rotor 258 may be exclusively in the first rotational direction 270, such that water flows only from the inlet 216 to the outlet 218. Thus, while the restrictive torque may hinder rotation of the rotor 258 in the first rotational direction 270, the restrictive torque does not cause rotation of the rotor 258 in the second rotational direction 272.

Controller 108 may selectively and alternately initiate a propulsive torque and a restrictive torque based on a preset output flow rate. The torque(s) may be further based on a determined flow rate, e.g., of water through fluid supply conduit 202. For instance, the torque(s) may be based on a determined flow rate through inductive regulator 214. Controller 108 may selectively increase or decrease the flow of fluid through inductive regulator 214 depending on whether the flow rate of water through fluid supply conduit 202 is determined to be greater than or less than the preset output flow rate. Controller 108 may be configured to initiate a propulsive torque at magnetic element 264 the first rotational direction 270 if the determined flow rate is less than the preset output flow rate. Controller 108 may also be configured to initiate a restrictive torque at the magnetic element 264 in the second rotational direction 272 if the determined flow rate is greater than the preset output flow rate. Optionally, the determined flow rate may be based on an induced current from electrical stator 266 that was generated in response to a flow-motivated rotation of rotor 258.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
    a cabinet;
    a wash tub positioned within the cabinet;
    a wash basket rotatably mounted within the wash tub, the wash basket defining a wash chamber for receiving articles for washing;
    a fluid supply conduit extending between a water supply and the wash tub; and
    an inductive regulator positioned along the fluid supply conduit downstream from the water supply, the inductive regulator comprising
        a regulator body defining an enclosed cavity extending between a regulator inlet and a regulator outlet,
        a rotor rotatably disposed within the regulator body,
        a magnetic element attached to the rotor to rotate therewith, and
        an electrical stator disposed outside of the enclosed cavity in selective magnetic communication with the magnetic element.

2. The washing machine appliance of claim 1, wherein the fluid conduit includes a flow reservoir upstream from the inductive regulator to contain a predetermined volume of fluid.

3. The washing machine appliance of claim 1, wherein the rotor includes a plurality of radial fins to adjust a fluid flow through the enclosed cavity.

4. The washing machine appliance of claim 1, wherein the rotor includes a spoke defining an axis of rotation, wherein the magnetic element is fixed to the rotor about the spoke.

5. The washing machine appliance of claim 1, wherein the electrical stator includes a conductive winding positioned about the magnetic element.

6. The washing machine appliance of claim 1, further comprising a controller electrically coupled to the electrical stator in operable communication with the magnetic element.

7. The washing machine appliance of claim 6, wherein the controller is configured to selectively direct a torque current to the electrical stator to control rotation of the rotor based on a determined flow rate through the fluid conduit.

8. The washing machine of claim 7, wherein the controller includes a preset output flow rate, and wherein the controller is further configured to
    initiate a propulsive torque at the magnetic element in a first rotational direction if the determined flow rate is less than the preset output flow rate, and
    initiate a restrictive torque at the magnetic element in a second rotational direction if the determined flow rate is greater than the preset output flow rate.

9. The washing machine appliance of claim 7, wherein the controller is configured to selectively receive an induced current from the electrical stator in response to a flow-motivated rotation of the rotor.

10. The washing machine appliance of claim 1, further comprising
    an additive dispenser to store a wash additive, and
    an additive supply conduit defining a siphon channel extending from the additive dispenser to the fluid supply conduit downstream from the inductive regulator.

11. The washing machine appliance of claim 10, further comprising a Venturi nozzle downstream from the inductive regulator in fluid communication with the additive supply conduit.

12. A washing machine appliance comprising:
    a cabinet;
    a wash tub positioned within the cabinet;
    a wash basket rotatably mounted within the wash tub, the wash basket defining a wash chamber for receiving articles for washing;
    a fluid supply conduit extending between a water supply and the wash tub;
    an inductive regulator positioned along the fluid supply conduit downstream from the water supply, the inductive regulator comprising
        a regulator body defining an enclosed cavity extending between a regulator inlet and a regulator outlet,
        a rotor rotatably disposed within the regulator body,
        a magnetic element attached to the rotor to rotate therewith, and
        an electrical stator disposed outside of the enclosed cavity in selective magnetic communication with the magnetic element; and
    a controller electrically coupled to the electrical stator in operable communication with the magnetic element, the controller being configured to selectively direct a torque current to the electrical stator to control rotation of the rotor.

13. The washing machine appliance of claim 12, wherein the fluid conduit includes a flow reservoir upstream from the inductive regulator to contain a predetermined volume of fluid.

14. The washing machine appliance of claim 12, wherein the rotor includes a plurality of radial fins to adjust a fluid flow through the enclosed cavity.

15. The washing machine appliance of claim 12, wherein the rotor includes a spoke defining an axis of rotation, wherein the magnetic element is fixed to the rotor about the spoke.

16. The washing machine appliance of claim 12, wherein the electrical stator includes a conductive winding positioned about the magnetic element.

17. The washing machine of claim 12, wherein the controller is further configured to alternately initiate a propulsive torque at the magnetic element in a first rotational direction, and initiate a restrictive torque at the magnetic element in a second rotational direction.

18. The washing machine appliance of claim 12, wherein the controller is configured to selectively receive an induced current from the electrical stator in response to a flow-motivated rotation of the rotor.

19. The washing machine appliance of claim 12, further comprising
an additive dispenser to store a wash additive, and
an additive supply conduit defining a siphon channel extending from the additive dispenser to the fluid supply conduit downstream from the inductive regulator.

20. The washing machine appliance of claim 19, further comprising a Venturi nozzle downstream from the inductive regulator in fluid communication with the additive supply conduit.

* * * * *